United States Patent [19]
Hayashi

[11] Patent Number: 6,091,736
[45] Date of Patent: Jul. 18, 2000

[54] MESSAGE STORING AND REPRODUCING SYSTEM SEPARATELY COMPRISING PROCESSORS AND STORAGES

[75] Inventor: Shinji Hayashi, Tokyo, Japan

[73] Assignee: NEC Corporation, Tokyo, Japan

[21] Appl. No.: 08/852,546

[22] Filed: May 7, 1997

[30] Foreign Application Priority Data

May 8, 1996 [JP] Japan .................................. 8-112874

[51] Int. Cl.[7] ............................................... H04L 12/54
[52] U.S. Cl. ......................... 370/428; 379/68; 379/88.25
[58] Field of Search .................................. 370/389, 395, 370/401, 406, 407, 408, 412, 428, 354; 379/66, 68, 82, 83, 85, 87, 88.25, 89, 212, 232, 67, 70, 76, 84

[56] References Cited

U.S. PATENT DOCUMENTS

| | | | |
|---|---|---|---|
| 4,549,047 | 10/1985 | Brian et al. | 379/88.26 |
| 4,646,346 | 2/1987 | Emerson et al. | 379/214 |
| 4,935,954 | 6/1990 | Thompson et al. | 379/88.04 |
| 5,023,772 | 6/1991 | King | 364/241 |
| 5,029,199 | 7/1991 | Jones et al. | 370/428 |
| 5,031,218 | 7/1991 | Galand et al. | 704/233 |
| 5,199,062 | 3/1993 | Von Meister et al. | 370/259 |
| 5,394,445 | 2/1995 | Ball et al. | 379/67 |
| 5,394,460 | 2/1995 | Olson et al. | 379/88.26 |
| 5,412,719 | 5/1995 | Hamamoto et al. | 380/9 |
| 5,422,936 | 6/1995 | Atwell | 379/88.23 |
| 5,475,737 | 12/1995 | Garner | 379/82 |
| 5,479,411 | 12/1995 | Klein | 379/68 |
| 5,555,288 | 9/1996 | Wilson et al. | 379/88.01 |
| 5,592,532 | 1/1997 | Koizumi | 455/412 |
| 5,657,376 | 8/1997 | Espeut et al. | 379/88.17 |
| 5,699,412 | 12/1997 | Polcyn | 379/34 |
| 5,712,903 | 1/1998 | Bartholomew et al. | 370/354 |
| 5,761,201 | 6/1998 | Vaudreuil | 370/392 |
| 5,818,836 | 10/1998 | DuVal | 370/389 |

FOREIGN PATENT DOCUMENTS

| | | |
|---|---|---|
| 0 557 813 A1 | 9/1993 | European Pat. Off. . |
| 4-208749 | 7/1992 | Japan . |
| 5-236006 | 9/1993 | Japan . |
| WO 80 01349 | 6/1980 | WIPO . |

OTHER PUBLICATIONS

Iwamasa Nishikado et al., Voice Storage System for Centralized Extension System, Review of the Electrical Communication Lab., vol. 32, No. 6, Nov. 1984, pp. 1010–1018.

Hidemitsu Kawanaka et al., Voil Mail System, Review of the Electrical Communications Lab., vol. 35 No. 6, 1987, pp. 613–620.

*Primary Examiner*—Dang Ton
*Assistant Examiner*—Phirin Sam
*Attorney, Agent, or Firm*—Foley & Lardner

[57] ABSTRACT

For a service with no interruption even upon occurrence of a fault in a message processor, such message processors and message storages are separately included in a message processing and reproducing system and are connected through a control device which makes an exchange network use another message processor upon occurrence of the fault.

9 Claims, 5 Drawing Sheets

MESSAGE STORING AND REPRODUCING SYSTEM SEPARATELY COMPRISING PROCESSORS AND STORAGES

BACKGROUND OF THE INVENTION

This invention relates to a message storing and reproducing system and, more particularly, to a system which is of the type described and is connected to a message exchange network for a plurality of subscriber sets or subscribers and which comprises a predetermined number of message storages for storing messages or voice sequences from certain ones of the subscriber sets for reproduction.

When the messages are the voice sequences, the message storing and reproducing system is often called a voice storing and reproducing service system and will so be referred to herein. The message exchange network is in this case a telephone exchange network that is typically a public telephone network and may alternatively be a mobile communication exchange network accommodating mobile units as at least a part of the subscriber sets.

In the manner described in greater detail below, a conventional voice storing and reproducing service system comprises a preselected number of voice processing and storing units connected to the telephone exchange network. Each voice processing and storing unit comprises a memory which may be a memory area of a memory unit common to parts of the voice storing and reproducing units.

It will be assumed that one of the subscribers wishes as an originating subscriber to enjoy a service of the voice storing and reproducing service system. Sent through the exchange network by the originating subscriber by using his subscriber set, an originating voice sequence is processed by one of the voice processing and storing units into a message datum to be stored therein as a stored message. As a consequence, this one of the voice processing and storing units is assigned to the originating subscriber as an assigned voice processing and reproducing unit. When the originating subscriber sends a reproducing request which specifies one of the subscribers as a specified subscriber, the assigned voice processing and storing unit reads the stored message as a read message and processes the read message into a reproduced voice sequence to send the reproduced voice sequence through the message exchange network to one of the subscriber sets that is attended to by the specified subscriber. In this manner, the service includes storage and reproduction of a voice sequence and may further comprise cancellation and other processing functions of the voice sequence.

In the conventional voice storing and reproducing service system, the originating subscriber can not access other voice processing and storing units from one to another while enjoying the service with the voice processing and storing unit assigned to him. For example, the originating subscriber can not reproduce a stored datum from one of the voice processing and storing units that is not assigned to him.

It should be noted in this connection that each voice processing and storing unit must be operable in various manners and is liable to a fault. If the fault is present in the assigned voice processing and storing unit, complicated switching must be carried out among the voice processing and storing units.

A voice mail information transfer system is disclosed in Japanese Patent Prepublication (A) No. 208,749 of 1992. A voice file reproduction system is revealed in Japanese Patent Prepublication (A) No. 236,006 of 1993. A voice mail system for a plurality of groups of subscriber sets was invented by Shin-ichi Matsuoka, assignor to the present assignee, and filed Feb. 27, 1996, in the United States as patent application Ser. No. 08/607,460. Each of these three prior art systems is operable as a voice storing and reproducing service system and yet has the above-mentioned defects. The system of Matsuoka is, however, provides excellent operation when the subscriber units are operable with different traffic. The specification of the Matsuoka patent application is therefore incorporated herein by reference.

SUMMARY OF THE INVENTION

In view of the foregoing, it is a principal object of the present invention to provide a message storing and reproducing system in which each of a plurality of subscribers can get access for a service to any one of stored messages stored in the message storing and reproducing system.

It is another principal object of this invention to provide a message storing and reproducing system which is of the type described and can readily continue for one of the subscribers to offer the service even upon occurrence of a fault in one or more message processing parts of the message storing and reproducing system.

It is a subordinate object of this invention to provide a message storing and reproducing system which is of the type described and is operable at a high speed.

Other objects of this invention will become clear as the description proceeds.

In accordance with this invention, there is provided a message storing and reproducing system comprising primary means for processing, into processed messages, transmission messages sent from a plurality of subscriber sets, secondary means for storing the processed messages as stored messages for reproduction, and control means for controlling connection between the primary and the secondary means in response to an indication.

DESCRIPTION OF THE PREFERRED EMBODIMENTS

Figure 1:
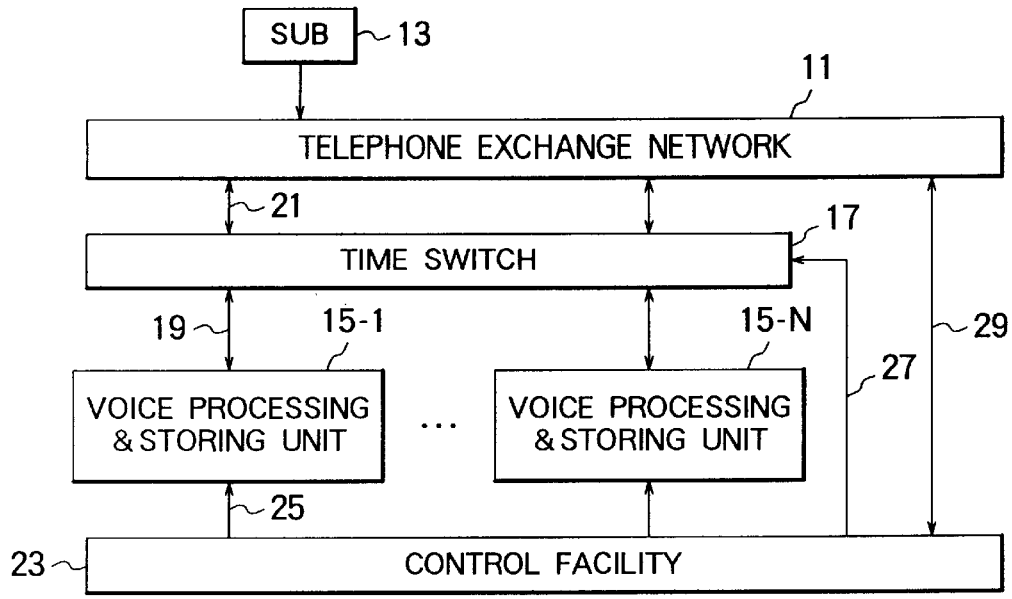
FIG. 1 is a block diagram of a conventional voice storing and reproducing service system which is connected to a plurality of subscriber sets through a telephone exchange network.

Referring to FIG. 1, a conventional voice storing and reproducing service system will first be described in order to facilitate an understanding of the present invention. The voice storing and reproducing service system is connected to a telephone exchange network 11 which is connected in turn to a plurality of subscriber sets, for example, five thousand subscriber sets. As a representative, only one of the subscriber sets is depicted at 13 and labelled SUB.

In the voice storing and reproducing service system, a voice processing and storing device 15 comprises first to N-th voice processing and storing units 15-1 to 15-N, where N represents a preselected integer which is equal to two or more. A time switch 17 is connected to the first to the N-th voice processing and storing units 15-1 to 15-N through a plurality of internal message lines 19, respectively, and to the telephone exchange network 11 through a plurality of external message lines 21 which are in one-to-one correspondence to the internal message lines 19. A control facility 23 is connected to the first to the N-th voice processing and reproducing units 15-1 to 15-N through a plurality of internal control lines 25, respectively, to the time switch 17 through an additional line 27, and to the telephone exchange network 11 through an external control line 29. Each of the voice processing and storing units 15-1 to 15-N comprises a memory (not shown).

In operation, it will be assumed that the illustrated subscriber set 13 is used by an originating attendant and that the originating attendant wishes to enjoy a service of storing an originating voice message in the voice storing and reproducing service system. Responsive to start of the voice message transmitted through the telephone exchange network 11 and the external control line 29, the control facility 23 makes the telephone exchange network 11 assign to the subscriber set 13 one of the first to the N-th voice processing and storing units 15-1 to 15-N as an assigned voice processing and storing unit. Processing the voice message into a processed message, the assigned voice processing unit.- stores the processed message in the assigned voice processing unit as a stored message which includes a telephone directory number of the subscriber unit 13 as an originating directory number. At the start of the voice message, the control facility 23 energizes the time switch 17 to transmit the voice message from the telephone exchange network 11 to the assigned voice processing and storing unit in an incoming time division multiplexed signal.

It will next be assumed that the originating attendant wishes as the service to reproduce the stored message from the voice storing and reproducing service system as a reproduced voice message. Responsive to a reproduction request issued at the subscriber set 13, the telephone exchange network 11 accesses the assigned voice processing and storing unit. The control facility 23 makes the assigned voice processing and storing unit read the stored message as a read message and reproduce the reproduced voice message from the read message in an outgoing time division multiplexed signal. The time switch 17 demultiplexes the reproduced voice message from the outgoing time division multiplexed signal for delivery back to the subscriber unit 13 through the telephone exchange network 11.

In the manner disclosed in the Matsuoka patent application referred to hereinabove, the memory may be a memory area of a memory unit common to parts of the voice storing and reproducing units 15-1 to 15-N. As described hereinabove, the service may further be cancelling the stored message and subjecting a part of the stored message to amendment. The conventional voice storing and reproducing service system has various defects pointed out heretobefore.

Figure 2:
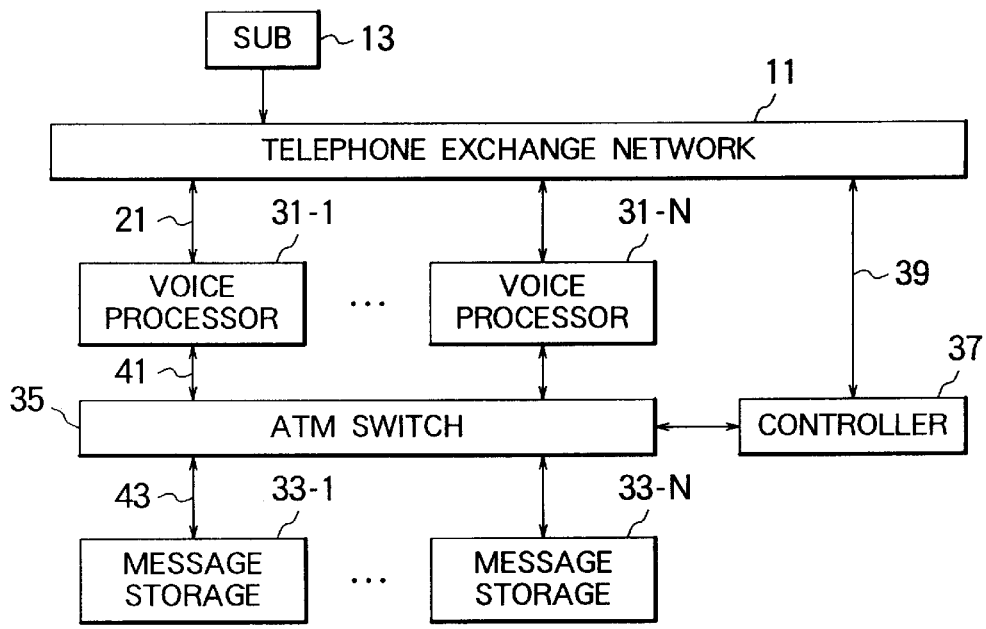
FIG. 2 is a block diagram of a message storing and reproducing system according to a first embodiment of the instant invention and is connected to a plurality of subscriber sets through a message exchange network.

Referring to FIG. 2, the description will proceed to a message storing and reproducing system according to a first preferred embodiment of this invention. Throughout the following, such a message storing and reproducing system will be described as a voice storing and reproducing service system.

The voice storing and reproducing service system is connected to a telephone exchange network 11 for a plurality of subscriber sets, one of which is depicted as a representative at 13 with the label SUB. This voice storing and reproducing service system need not comprise the time switch 17 described in conjunction with FIG. 1.

Connected to the telephone exchange network 11 is a message processor or voice processing device 31 comprising first through N-th voice or message processors 31-1 to 31-N, where N represents a first predetermined number which may be identical with the preselected integer and is therefore represented by an identical letter. A message storage or storage processing device 33 comprises first to N-th message storages or storage processors 33-1 to 33-N. Although represented by N, the storage processors may be equal in number to a second predetermined integer, which is not greater than the first predetermined number.

The message processors 31-1 to 31-N and the message storages 33-1 to 33-N are connected to an ATM (asynchronous transfer mode) switch 35, which is controlled by a control unit or controller 37 connected through a control line 39 to the telephone exchange network 11. This control line 39 is preferably a signal line of a common-line signal scheme and is capable of transmitting circuit connection signals and application signals.

Each of the first to the N-th message processors 31-1 to 31-N is connected to the telephone exchange network 11 through an external message line 21 of the type described in connection with FIG. 1 and to the ATM switch 35 by a first ATM channel 41. Each of the first to the N-th message storages 33-1 to 33-N is connected to the ATM switch 35 by a second ATM channel 43. A combination of the ATM switch 35 and the controller 37 corresponds to the control facility 23 of FIG. 1.

In operation, it will again be presumed that an originating attendant uses the illustrated subscriber set 13 in enjoying a service of the voice storing and reproducing service system to store an originating voice message specifying one of the subscriber sets as a specified set and that the telephone exchange network 11 deals with such an originating voice message as a 64-Kbps PCM (pulse code modulated) message signal. Responsive to start of the originating voice message, the controller 37 assigns one of the first to the N-th message processors 31-1 to 31-N to make the telephone exchange network 11 connect the subscriber set 13 to this one of the message processors 31-1 to 31-N as an assigned processor. Each of the first to the N-th message processors 31-1 to 31-N processes a voice message into a processed message by real time converting the PCM message signal to an ADPCM (adaptive differential PCM) file.

The controller 37 further assigns one of the first to the N-th message storages 33-1 to 33-N as an assigned storage to the originating voice message and makes the ATM switch 35 connect the assigned processor and storage through the first and the second ATM channels 41 and 43. The processed message is stored in the assigned storage as a stored message, which includes telephone directory numbers of the subscriber set 13 and the specified set.

At an end of the originating voice message, the telephone exchange network 11 disconnects the assigned processor to turn the assigned message processor back to one of the first to the N-th message processors 31-1 to 31-N. Moreover, the controller 37 disconnects from the ATM switch 35 this one of first to N-th message processors and the assigned storage to turn the latter back to mere one of the first to the N-th message storages 33-1 to 33-N. That is, the assigned processor and storage are rendered idle.

In short, the illustrated voice storing and reproducing service system separately comprises the message processor device 31 and the message storage device 33. The message processor and the storage devices 31 and 33 are connected through the ATM channels 41 and 43 by the ATM switch 35 which is controlled by the controller 37 to transfer the voice message at high speed between the assigned processor and storage. It is possible to use a high speed LAN (local area network) as a combination of the ATM switch 35 and the ATM channels 41 and 43.

The message processors 31-1 to 31-N must perform complicated operations during the service of the voice storing and reproducing service system. In the manner described before and will presently be exemplified, the service may be reproduction by the assigned processor of the stored message stored in the assigned storage. During reproduction, the assigned processor reads the stored message from the assigned storage as a voice guidance and subjects the voice guidance to inverted conversion to the PCM signal and to a reproduced voice message. Furthermore, the assigned processor may combine a plurality of voice guidances into a single guidance for reproduction into a reproduced voice message. Such a service may include canceling the stored message and to changing at least a part of the stored message.

Inasmuch as the message processors 31-1 to 31-N are separated from the message storages 33-1 to 33-N, it is possible for the originating attendant to access an assigned storage even when a fault is present in the assigned processor. More particularly, in the manner which will later be described, the controller 37 can locate a fault in any one of the first to the N-th message processors 31-1 to 31-N. When the fault is found so that one of the message processors 31-1 to 31-N is a faulty processor, the controller 37 blocks the faulty processor and newly assigns, as a new assigned processor to continue the service, one of the message processors 31-1 to 31-N that is idle.

Figure 3:
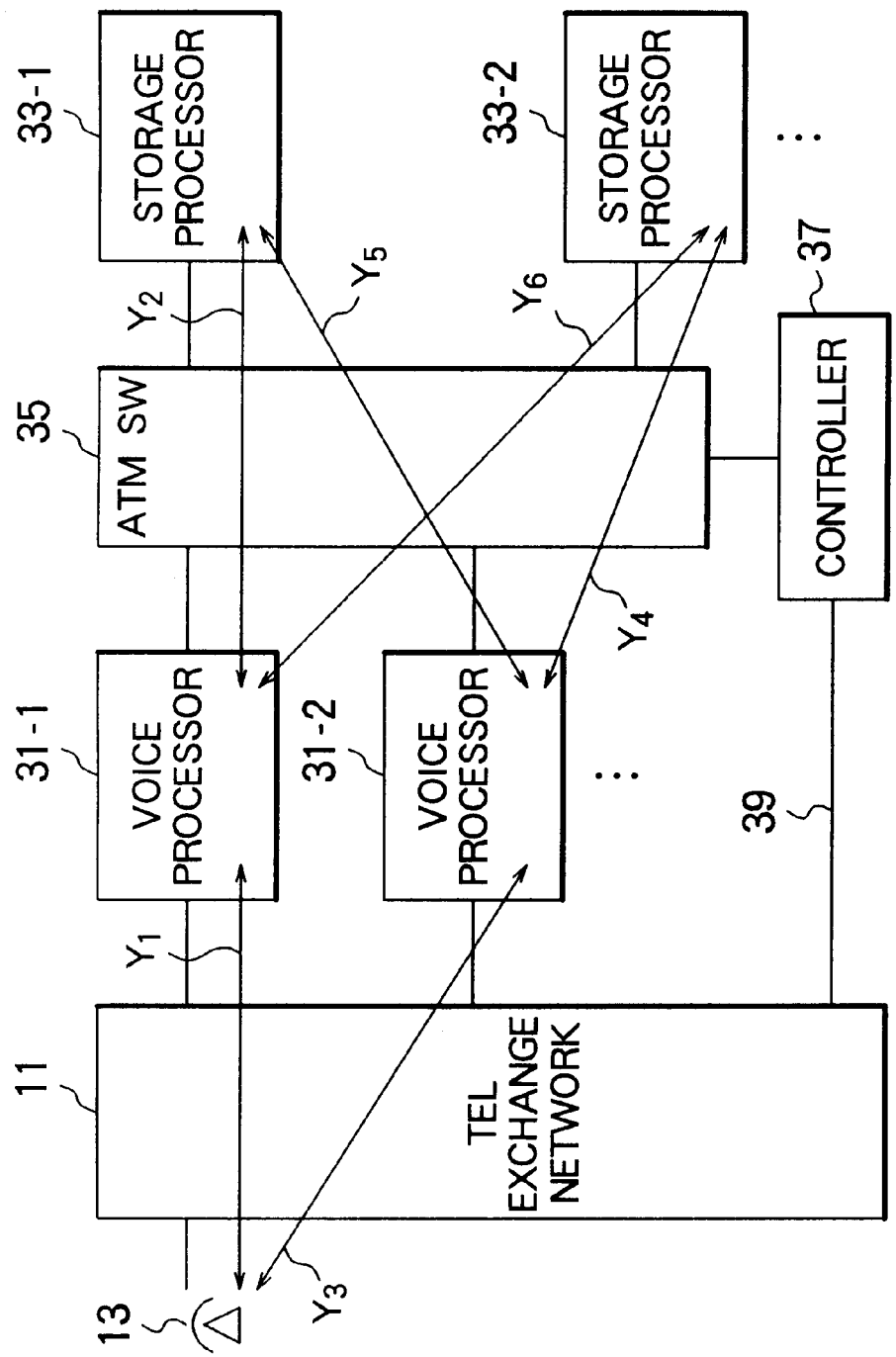
FIG. 3 is a block diagram for use in describing operation of the message storing and reproducing system illustrated in FIG. 2.

Turning to FIG. 3, operation will be described more in detail with regard to the voice storing and reproducing service system being illustrated. In FIG. 3, depicted are two of the message processors 31-1 to 31-N as first and second message processors 31-1 and 31-2 and two of the message storages 33-1 to 33-N as first and second message storages 33-1 and 33-2 by way of example.

When the originating attendant requests voice storing and other processing services by the subscriber set 13, the telephone exchange network 11 sends an arrival signal to the controller 37 through the control line 39. It will be assumed that the controller 37 assigns the first message processor 31-1 as the assigned processor and the first message storage 33-1 as the assigned storage and searches for, by the telephone directory number of the subscriber set 13, also the first message storage 33-1 as the assigned storage for reproduction, cancellation, and at least partial change of the stored message. During progress of such a service, the first message processor 31-1 deals with storage and reproduction relative to the first message storage 33-1 in the manner indicated by bidirectional arrow lines Y1 and Y2.

Furthermore, the originating attendant can use the subscriber set 13 in storing and in reproducing a stored message by using the second message storage 33-2 in which such a stored message is stored from a different subscriber set which is accommodated by the telephone exchange network 11 as another (not shown) of the plurality of subscriber sets. It will be assumed that the controller 37 assigns, for example, the first message processor 31-1 to this service as the assigned processor and, with reference to the telephone directory number of the different subscriber set, the second message storage 33-2 as an assigned storage. During progress of the service, the subscriber set 13 uses the first message processor 31-1 and the second message storage 33-2 as indicated by the line Y1 and a different arrow line Y6.

Summarizing, it has become possible by this invention to deal with storage and reproduction of stored messages in the message storages 33-1 to 33-N accessible by a multiplicity of subscriber sets. In addition, it has become feasible to proceed with such a service without deterioration in quality of the service.

If a fault takes place, for example, in the first message processor 31-1, the controller 37 blocks out this message processor as a faulty processor. In this event, the subscriber unit 13 accesses the second message processor 31-2 instead of the faulty processor to make the second message processor 31-2 use the ATM switch 35 in storage and reproduction of the voice message by using the first message storage 33-1 in the manner indicated by arrow lines Y3 and Y5. When the first message storage 33-1 is busy as a busy storages and is not accessible, the message processor 31-2 can use the second message storage 33-2 rather than the busy storage for the storage as indicated by the line Y3 and a different arrow line Y4. If a fault occurs in the second message processor 31-2 rather than in the first message processor 31-1, the first message processor 33-1 uses either the first message storage 33-1 as indicated by the arrow lines Y1 and Y2 or the second message storage 33-2 in the manner indicated by arrow lines Y1 and Y6.

In this manner, the illustrated voice storing and reproducing service system can continue service with no deterioration in quality by merely excluding from use a certain one or more of the voice processors 31-1 to 31-N that has fallen into misoperation. This is because the message processor device 31 is separated according to this invention from the message storage device 33.

Figure 4:
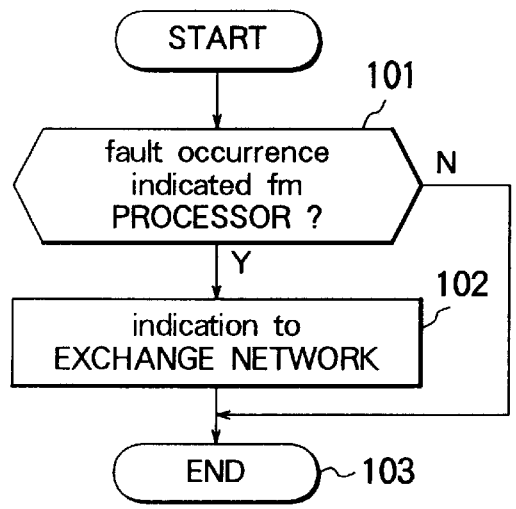
FIG. 4 shows a flow chart for use in describing a part of operation of a control device used in the message storing and reproducing system depicted in FIG. 2.

Referring now to FIG. 4 in addition to FIG. 2, the controller 37 detects a fault in one of the first to the N-th message processors 31-1 to 31-N that may be in whichever of conditions of idle and busy. For this purpose, the controller 37 may be an electronic digital computer which comprises a processor, a memory, and a hard disk device. A fault tolerant computer is preferred in order to achieve a high reliability.

After start by the arrival signal, the controller 37 first judges whether or not fault occurrence is indicated thereto from each of the message processors 31-1 to 31-N in the manner indicated in a first primary step 101. If the fault occurrence is indicated, the controller 37 sends an indication through the control line 39 to the telephone exchange network 11 so that the same may not use as indicated by a second primary step 102 the message processor that has made the controller 37 send the indication even if the message processor under consideration is assigned by the controller 37 as the assigned processor. In response, the telephone exchange network 11 avoids use of the message processor in question as represented by a third primary step 103 that is an end of this process. If the fault occurrence is indicated by none of the message processors 31-1 to 31-N, the first primary 101 step jumps to the third primary step 103 with no additional processes.

Figure 5:
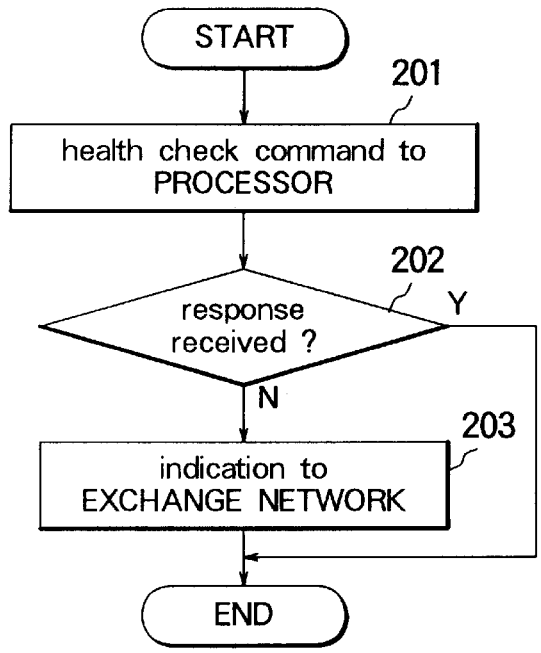
FIG. 5 shows a flow chart for use in describing another part of operation of the control device mentioned in conjunction with FIG. 4.

Turning to FIG. 5 with FIG. 2 continuously referred to, the controller 37 confirms presence or absence of a fault individually in the message processors 31-1 to 31-N. For this purpose, the controller 37 sends at a first secondary step 201 a health check command as a query to each message processors. If no response is received in answer to the command at a second secondary step 202, it is surmised that a fault is present in the message processor to which the command is directed. An indication is sent through the control line 39 to make the telephone exchange network 11 exclude from use at a third secondary step 203 the message processor in which the fault has taken place. This process comes thereby to an end.

If a response is received from the message processor to which the command is directed, the second secondary step 202 at once comes to the end. It is sufficient in the first secondary step 201 for confirmation of the response to send the command once about per minute.

Figure 6:
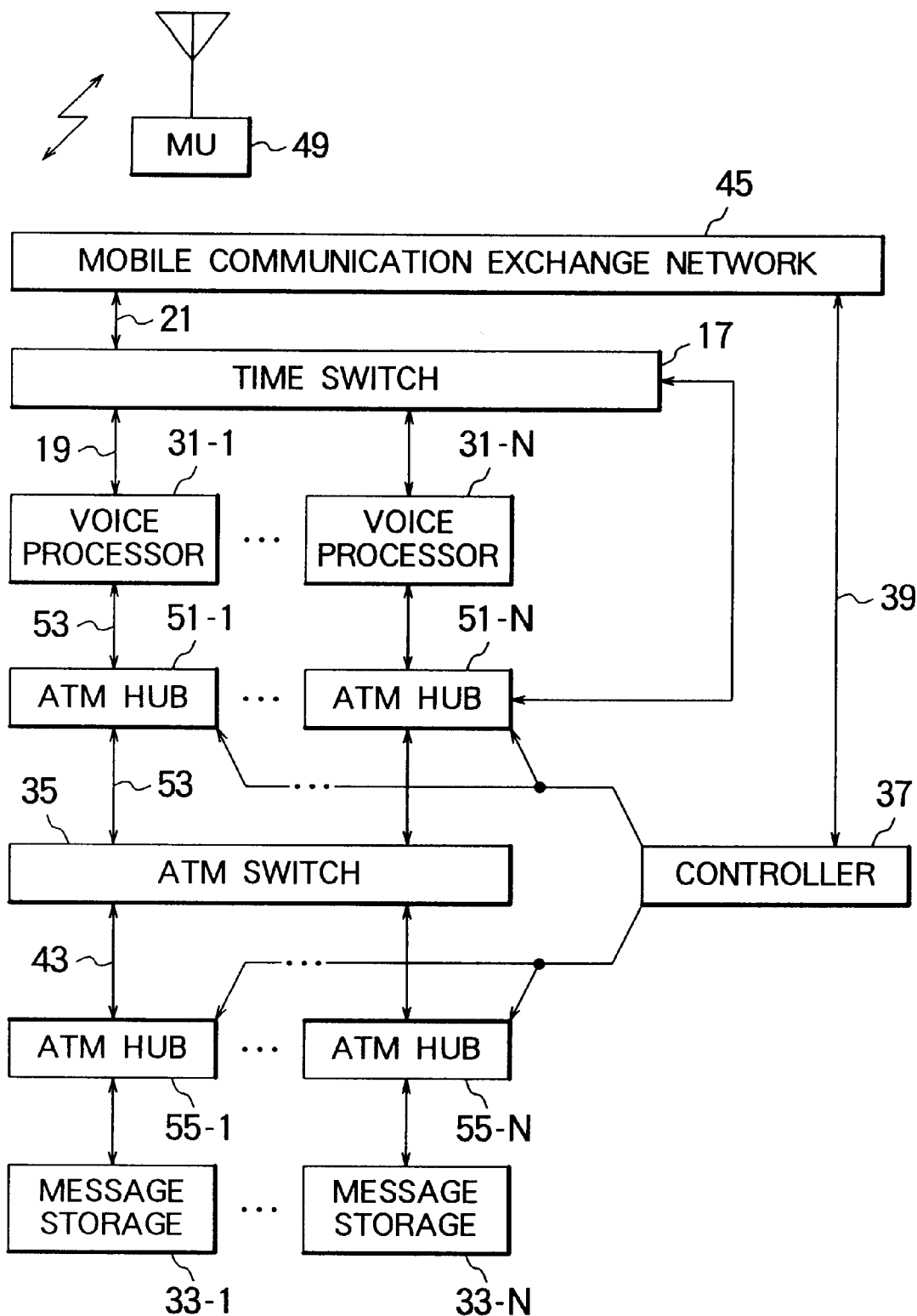
FIG. 6 is a block diagram of a message storing and reproducing system according to a second embodiment of this invention and is connected to a mobile communication exchange network and thence to one or more mobile units used at least as a part of a plurality of subscriber sets.

Referring to FIG. 6, attention will be directed to another voice storing and reproducing service system which is a message storing and reproducing system according to a second preferred embodiment of this invention. This voice storing and reproducing service system is connected to a mobile communication exchange network 45 for a plurality of mobile units and comprises the time switch 17 described in conjunction with FIG. 1. One of the mobile units is depicted as a representative at 49 and labelled MU. Such a mobile unit may be a portable handset.

In the voice storing and reproducing service system, the time switch 17 is connected to the first to the N-th voice processors 31-1 to 31-N through the internal message lines 19 of the type described with reference to FIG. 1. First to N-th primary ATM hubs 51-1 to 51-N are connected to the first to the N-th message processors 31-1 to 31-N, respectively, by a plurality of message channels 53 which are the 10 BASE-T channels, namely, the Ethernet 10 [Mbps]-UTP channels of the category 3 channels according to the Ethernet Standard IEEE 803.2 or the Ethernet Specification Ver. 2.0. Each primary ATM hub is connected to the ATM switch 35 through the first ATM channel 41 described in connection with FIG. 2.

First to N-th secondary ATM hubs 55-1 to 55-N are connected between the ATM switch 35 and the first to the N-th message storages 33-1 to 33-N, respectively. The second ATM channel 43 is used between the ATM switch 35 and each secondary ATM hub. Instead of the ATM switch 35, the controller 37 controls the first to the N-th primary and secondary ATM hubs 51-1 to 51-N and 55-1 to 55-N, which are for controlling in turn the first to the N-th message processors 31-1 to 31-N and the first to the N-th message storages 33-1 to 33-N. This enables each message processor or storage to have a small capacity and raises a building blockness. Preferably, each primary or secondary ATM hub is an Ethernet hub including an ATM interface of a 155 [Mbps]-MMF (STM-1) based on the ATM Forum.

In the example being illustrated, the time switch 17 is used to make it unnecessary to inform of occurrence of the fault in the first to the N-th message processors 31-1 to 31-N by confirming the fault in the voice storing and reproducing service system. In addition, the time switch 17 enables wrap test of the system.

Figure 7:
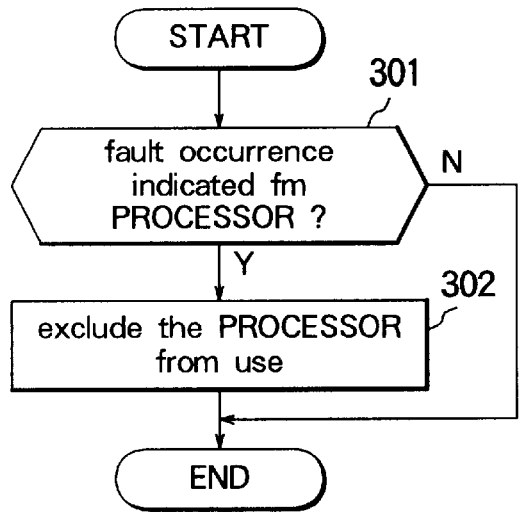
FIG. 7 shows a flow chart for use in describing a part of operation of a control device used in the message storing and reproducing system depicted in FIG. 6.
Figure 8:
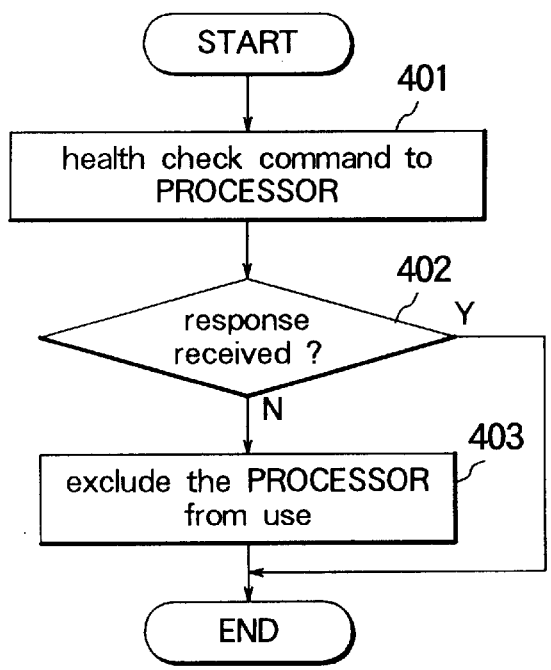
FIG. 8 shows a flow chart for use in describing another part of operation of the control device mentioned in connection with FIG. 7.

Turning to FIGS. 7 and 8 with FIG. 6 in mind, the controller 37 detects the fault and controls the ATM hubs 51-1 to 51-N and 55-1 to 55-N as follows. For detection and control, processes are similar to those illustrated with reference to FIGS. 4 and 5.

In FIG. 7, the controller 37 first judges at a first tertiary step 301 whether or not an indication of occurrence of the fault is received from the message processors 31-1 to 31-N. If the occurrence is indicated, the controller 37 excludes from use at a second tertiary step 302 the message processor that has indicated the occurrence. The process comes to an end. If no indication is received at the first tertiary step 301, the process directly comes to the end.

In FIG. 8, the controller 37 individually confirms by sending at a first quaternary step 401 a health check command as a query to each message processor. When no response is received at a second quaternary step 402, it is surmised that a fault has taken place in the message processor to which the command is sent. The message processor under consideration is excluded at a third quaternary step 403 from use. This process thereby comes to an end.

If a response is received at the second quaternary step 402 from the message processor to which the command is directed, the process comes to the end with no further processing. Like in FIG. 5, it is sufficient in the first quaternary step 401 to produce the health check command about once per minute.

In the manner thus far described, the message processor device 31 and the message storage device 33 are separated in contrast to prior art where the voice processing and storing device 15 is used instead. It is consequently enabled that the service is readily continued merely by blocking the message processor which deals with an implicated process and is subjected to the fault. Moreover, it is made possible with connection of the separated message processor and storage devices 31 and 33 by the high speed LAN comprising the ATM switch 35 to carry out with no deterioration in quality a service of storing and reproducing the processed message in and from a pertinent one of the first to the N-th message storages 33-1 to 33-N that may be used by any one of the subscriber sets or the mobile units, such as the subscriber set 13 or the mobile unit 49.

As so far described, the voice storing and reproducing service system comprises the message processor device 31 and the message storage device 33 which are separated from each other. A merit is thereby achieved to readily continue the service of storage, reproduction, cancellation, partial change, or the like by merely blocking the message processor in which a fault has occurred. Another merit is attained by using the high speed LAN in connecting the assigned processor and storage such that a service quality is not deteriorated during storage, reproduction, and other processing of the stored message in connection with a relevant one of the message processors 33-1 to 33-N that may be used either by the subscriber sets and/or the mobile units.

While this invention has been described in conjunction with only two preferred embodiments thereof, it will now be readily possible for one skilled in the art to carry this invention into practice in various other manners. Above all, it is possible to use the voice storing and reproducing service system of this invention as a message storing and reproducing system in storing the originating voice message and a like message, which are herein referred to collectively as transmission messages. Such a message storing and reproducing system can reproduce from each stored message the reproduced voice message and a similar message that may collectively be called reproduced messages.

What is claimed is:

1. A message storing and reproducing system comprising:

primary means for processing, into processed messages, transmission messages sent from a plurality of subscriber sets;

secondary means for storing said processed messages as stored messages for reproduction; and control means for controlling connection between said primary and said secondary means in response to a fault indication in said primary means, wherein said primary means further processes, into reproduced messages for transmission to said subscriber sets, the stored messages sent from said secondary means through said control means additionally as said transmission messages in response to a reproduction request, wherein said subscriber sets are connected to said message storing and reproducing system through an exchange network, wherein said primary means comprises a first predetermined number of message processors, less in number than in said plurality of subscriber sets, for processing into said processed messages, respectively, the transmission messages sent from said subscriber sets through said exchange network, and for processing into said reproduced messages, respectively, the stored messages sent from said secondary means through said control means, wherein said secondary means comprising a second predetermined number of message storages for storing as said stored messages, respectively, the processed messages sent from said message processors through said control means, said second predetermined number being not greater than said first predetermined number, wherein said indication indicates a fault in one of said message processors, wherein said control means transmits a query periodically to each of said message processors and discriminates said fault in one of said message processors when no response is received from said one of message processors in response to said query, and wherein said one of said message processors is placed off-line as a result.

2. The message storing and reproducing system as claimed in claim 1, wherein said control means produces in response to said indication a blocking signal which makes said exchange network use, instead of said one of message processors, another of said message processors in processing one of said transmission and said stored messages that is sent from one of said subscriber sets through said exchange network and said message storages through said control means.

3. The message storing and reproducing system as claimed in claim 2, wherein said control means comprises an asynchronous transfer mode switch-connected to said message processors and storages and switch control means for controlling said asynchronous transfer mode switch in response to whichever of said indication and said reproduction request.

4. The message storing and reproducing system as claimed in claim 3, wherein said processors and storages are connected to said asynchronous transfer mode switch by a plurality of asynchronous transfer mode channels.

5. The message storing and reproducing system as claimed in claim 4, wherein said asynchronous transfer mode switch and channels are used collectively as a local area network.

6. The message storing and reproducing system as claimed in claim 1, further comprising a plurality of asynchronous transfer mode hubs between said control means and said message processors and said message storages.

7. The message storing and reproducing system as claimed in claim 6, wherein said control means produces in response to said indication a blocking signal which makes said exchange network use, instead of said one of message processors, another of said message processors in processing one of said transmission and said stored messages that is sent from one of said subscriber sets through said exchange network and said message storage through said control means.

8. The message storing and reproducing system as claimed in claim 7, wherein said control means comprises an asynchronous transfer mode switch connected to said asynchronous mode transfer mode hubs and switch control means for controlling said asynchronous transfer mode hubs in response to whichever of said indication and said reproduction request.

9. A message storing and reproducing system comprising:

a primary unit configured to process, into processed messages, transmission messages sent from a plurality of subscriber sets, said primary unit comprising a plurality of message processors;

a secondary unit configured to store said processed messages as stored messages, said secondary unit comprising a plurality of message storages; and a controlling unit configured to control the connection between said primary unit and said secondary unit in response to either a fault indication in at least one of said plurality of message processors or a busy indication in at least one of said plurality of message storages, wherein said controlling unit is further configured to periodically transmit a query to each of said plurality of message processors to determine whether a fault exists in one or more of said plurality of message processors, wherein said one or more of said plurality of message processors that have a fault are placed off-line as a result, and wherein said fault indication is based on a failure of said one or more of said plurality of message processors to respond to said query.

* * * * *